United States Patent [19]

Van Heteren et al.

[11] 4,386,111

[45] May 31, 1983

[54] FAT BLEND

[75] Inventors: Jan Van Heteren; Jacobus N. Pronk, both of Vlaardingen; Willem J. Smeenk, Castricum; Leo F. Vermaas, Maassluis, all of Netherlands

[73] Assignee: Lever Brothers Company, New York, N.Y.

[21] Appl. No.: 267,284

[22] Filed: May 27, 1981

[30] Foreign Application Priority Data

May 30, 1980 [NL] Netherlands .......................... 8003143

[51] Int. Cl.$^3$ .......................... A23D 3/02; A23D 5/00
[52] U.S. Cl. ...................................... 426/603; 426/607
[58] Field of Search ................................ 426/603, 607

[56] References Cited

U.S. PATENT DOCUMENTS

| | | | |
|---|---|---|---|
| 2,143,651 | 1/1939 | Fisher et al. | 426/590 X |
| 2,197,457 | 4/1940 | Werk et al. | 426/603 |
| 2,589,119 | 11/1958 | Cochran et al. | 426/607 |
| 3,210,197 | 10/1965 | Galenkamp | 426/607 |
| 3,617,308 | 11/1971 | Graffelman | 426/607 X |
| 3,649,295 | 3/1972 | Bernhart | 426/801 X |
| 3,939,282 | 2/1976 | Carlile et al. | 426/607 X |
| 3,956,522 | 5/1976 | Kattenberg et al. | 426/607 X |
| 4,282,265 | 8/1981 | Theuer | 426/607 |

FOREIGN PATENT DOCUMENTS

| | | | |
|---|---|---|---|
| 593336 | 2/1960 | Canada | 426/607 |
| 2271770 | 12/1975 | France . | |
| 153599 | 2/1969 | Netherlands . | |
| 1245539 | 9/1971 | United Kingdom . | |
| 1495254 | 12/1977 | United Kingdom . | |

*Primary Examiner*—Robert A. Yoncoskie
*Attorney, Agent, or Firm*—Milton L. Honig; James J. Farrell

[57] ABSTRACT

The invention relates to a fat blend comprising 2–35 parts by weight of hardstock, 30–98 parts by weight of oil liquid at room temperature and 0–35 parts by weight of hydrogenated fat having a slip melting point of 25°–45° C. The fat blend can be used for producing margarines, low calorie margarines containing e.g. 35–60% by wt. of fat, and cooking fats.

The hardstock is an interesterified hydrogenated blend of (1) triglycerides derived from a fat rich in fatty acid residues having 16–18 carbon atoms, most of which are saturated, and (2) an olein fraction of a fat rich in lauric acid residues. The hydrogenation can be carried out before or after interesterification. The ratio of (1):(2) can be (20–80):(80–20), preferably (40–58):(60–42).

22 Claims, No Drawings

FAT BLEND

The invention relates to a fat blend, which can be worked into margarines and low calorie spreads or can be used as, for example, cooking fat, which fat blend comprises (a) an oil liquid at room temperature and (b) a randomly interesterified hydrogenated blend of, on the one hand, (b1) triglycerides derived from a fat rich in lauric acid residues and, on the other hand, (b2) triglycerides derived from a fat rich in fatty acid residues having from 16 to 18 carbon atoms.

Fat blends of this kind are known from U.S. Pat. No. 3,210,197. According to this patent specification a margarine fat can be prepared by blending 70–85 parts by weight of an oil which is liquid at room temperature and may be rich in linoleic acid residues, such as sunflower oil, corn oil or safflower oil, with 15–30 parts by weight of a hard fat having the following fatty acid composition:

| | |
|---|---|
| Caprylic acid | 1–2% by weight |
| Capric acid | 2–5% by weight |
| Lauric acid | 38–55% by weight |
| Myristic acid | 12–14% by weight |
| Palmitic acid | 10–12% by weight |
| Stearic acid | 20–29% by weight. |

One of the ways of obtaining such a hard fat is by randomly interesterifying a mixture of hardened palmkernel fat and hardened palm oil, fractionating the resulting product and separating the higher melting fraction as hard fat. The disadvantage of a hard fat prepared in this way is that quite a lot of it must be used, as a result of which (for example in the preparation of margarine fats for health margarines) an insufficient amount of oil containing linoleic acid residues can be included in the fat blend.

In order to be able to use higher proportions of oil rich in linoleic acid residues in such margarine fats, it was proposed in U.S. Pat. No. 3,956,522 to remove the higher melting components of an interesterified blend prepared from, on the one hand, hydrogenated fats of the lauric acid type and, on the other hand, fats that are rich in fatty acid residues having 16 to 18 carbon atoms. The remaining foot fraction can be used as an effective hard fat. In this manner margarine fats can be prepared which contain only 6–12% by weight of hard fat along with 94–88% by weight of oil rich in linoleic acid residues. However, the required fractionation is extremely critical with respect to the processing conditions, and just a slight deviation from the optimal process conditions can cause the advantages of the process described in the above U.S. patent to be completely nullified.

It has now been found that randomly interesterified hydrogenated blends of, on the one hand, a lower melting fraction of a fat rich in lauric acid residues and, on the other hand, a fat rich in fatty acid residues with 16 to 18 carbon atoms, are likewise very useful as a hard fat in the preparation of such fat blends, whereby the differences in fractionation conditions can easily be met by adjustment of the weight ratio of the fats to be interesterified and whereby a favourable influence on the melting properties of the final product (which appear from NMR measurements of the amount of solid phase at 35° C.) can find expression.

Accordingly, the present invention provides a fat blend which can be worked into margarines and low calorie spreads or which can be used as such, which fat blend comprises an oil liquid at room temperature and a randomly interesterified hydrogenated blend which is prepared, apart from the fat rich in fatty acid residues with 16 to 18 C atoms, from a lower melting fraction of a fat rich in lauric acid residues.

The randomly interesterified hydrogenated blend can be prepared by random interesterification and subsequent hydrogenation of the interesterified blend, or by hydrogenating part or all of its constituents and subsequent random interesterification of the constituents so treated.

In the latter case the blend to be interesterified may include some non-hydrogenated fat as well, e.g. palmkernel oil or coconut oil or their respective olein or stearin fractions, or fats rich in fatty acid residues with 16 to 18 carbon atoms, preferably their stearin fractions. Care should be taken, however, that the total degree of saturation of the randomly interesterified fat is sufficiently high to ensure that upon blending with the oil rich in linoleic acid residues, of the triglycerides obtained through interesterification as few as possible will dissolve in said oil. Such dissolved triglycerides will neither contribute to the linoleic acid content of the ultimate fat blend nor to its solids content, which is of importance with a view to the consistency of products prepared from such a fat blend.

In one embodiment, the present invention provides a fat blend and a process for preparing a fat blend that can be worked into margarines, low calorie spreads or cooking fats, which fat blend comprises (a) an oil liquid at room temperature and (b) a randomly interesterified hydrogenated blend of, on the one hand, (b1) triglycerides derived from a fat rich in lauric acid residues and, on the other hand, (b2) triglycerides derived from a fat that is rich in fatty acid residues having 16–18 carbon atoms, characterized in that:
(1) blend (b) is prepared by mixing 20–80 parts by weight of a lower melting fraction of a fat rich in lauric acid residues with 80–20 parts by weight of triglycerides derived from a fat rich in fatty acid residues with 16–18 carbon atoms, and randomly interesterifying the mixture obtained,
(2) 2–35 parts by weight of the interesterified blend (b) are mixed with 0–35 parts by weight of hydrogenated fat having a slip melting point of 25°–45° C., and with 98–30 parts by weight of oil liquid at room temperature.

Suitably, the percentage of saturated fatty acid residues is 75% or more of the total weight of fatty acid residues of the interesterified fat.

The degree of unsaturation that can be tolerated is of course influenced by the type of unsaturated acids present, the weight ratio between the interesterified fat and the oil rich in linoleic acid residues, the nature of the non-interesterified fats in the fat blend and the properties of the product to be prepared from said fat blend.

The number of constituents from which the interesterified blend is prepared should at least be two, viz the lauric fatty acid-containing olein and the $C_{16}$–$C_{18}$ type of fat.

Blends of various types of lauric acid type fats with said olein, on the one hand, and blends of various types of $C_{16}$–$C_{18}$ fats, on the other hand, can be used as well, all of course within the restrictions outlined above.

Preferably, the fat blend according to the invention comprises a blend of at least an oil rich in linoleic acid residues with a hard fat obtained by interesterification of, on the one hand, a hydrogenated lower-melting fraction of a fat rich in lauric acid residues (such as palmkernel oil or coconut oil, hydrogenated until the unsaturation has substantially disappeared) and on the other hand, a hydrogenated fraction of a fat rich in saturated fatty acid residues having 16-18 carbon atoms. The latter fraction may be both an olein and a stearin. Preferably, however, the latter fraction is a hydrogenated stearin, including that of palm oil, cottonseed oil, etc.

The weight ratio between the fats rich in lauric acid residues and the fat rich in fatty acid residues having 16-18 carbon atoms, can be determined comparatively easily, depending on the properties one wishes to impart to the fat blend to be prepared. This weight ratio will also be dependent on the type of lauric acid fat, the manner in which the fractionation was effected (fractionation with an organic solvent, or fractionation in the presence of a surface-active material, or a completely dry fractionation), the amount of higher-melting fraction that was removed, the type and the degree of hydrogenation of the fat rich in fatty acid residues having 16-18 carbon atoms and possibly also the kind of fraction (olein or stearin) and the degree to which the last-mentioned fat was fractionated, as well as to the fractionation technique used therefor and finally the types of oils and fats with which the hard fat according to the invention is combined for preparing the fat blend that is used in the margarine fat, the fat for the low calorie spread or the cooking fat.

The hard fat can be combined with one or more oils rich in polyunsaturated fatty acid residues, especially oils containing at least 40% by weight of fatty acid residues derived from linoleic acid; oils of this kind are, for example, safflower oil, sunflower oil, soy bean oil, corn oil, wheat germ oil, as well as mixtures of these oils and oils obtained from the raw materials mentioned, for example by fractionation and/or directed interesterification. The latter process takes place under conditions at which the higher-melting triglycerides formed as a result of interesterification crystallize out; higher-melting triglycerides so formed also contribute to the solid phase of the fat blend of the invention and may lead to a decrease in the percentage of interesterified hard fat required. On the other hand, removal of such higher-melting triglycerides consequently leads to triglyceride mixtures having a higher content of unsaturated, particularly polyunsaturated fatty acid residues, which triglyceride mixtures can be combined with the interesterified hard fat.

Equally, the fat blend according to the present invention can also be a hard fat prepared from the interesterified fat and an oil liquid at room temperature, admixed with fats having a higher melting point than the latter oil, such as for example hydrogenated vegetable oils having a slip melting point of 25°-45° C. Suitable proportions are, for example in such a case, 2-35% by weight of the interesterified hard fat, 2-35% by weight of hydrogenated fat of a melting point of 25°-45° C., and the balance of oil liquid at room temperature.

Preferably, however, the present invention is concerned with fat blends which are suitable for use in margarines, low calorie spreads, cooking fats, etc. having a high content of polyunsaturated fatty acid residues. Such fat blends contain 6-30 wt. parts of interesterified hard fat and 94-70 parts by weight of one or more oils containing at least 40% by weight of linoleic acid residues; it is particularly preferred that not more than 20%, especially not more than 15%, of the interesterified hard fat is used in the preparation of margarine fats rich in linoleic acid residues.

Suitable hard fats can be obtained by interesterification of 20-80 parts by weight of the fat rich in lauric acid residues and 80-20 parts by weight of the fat rich in fatty acid residues having 16 to 18 carbon atoms. It is preferred that the weight ratio between lauric type fats and the fats rich in $C_{16}$-$C_{18}$ fatty acid residues is between 35 and 65 wt. parts of the former and 65 and 35 wt. parts of the latter, particularly between 40 and 58, and 60 and 42 parts by weight, respectively. The constituents of the hard fat are preferably both hydrogenated to an iodine value of less than 10, especially less than 5 or 3. The best results can be obtained by interesterifying oleins of coconut oil or palmkernel oil having an iodine value of less than 3 with an hydrogenated $C_{16}$-$C_{18}$ fat, particularly palm oil or palm oil stearin having an iodine value of less than 3.

It is particularly preferred that the fat blend of the invention comprises 6-14% by weight of hard fats prepared from the last-mentioned mixtures and 94-86% by weight of oil rich in linoleic acid residues. Such blends are particularly suitable for the preparation of fat blends suitable for health margarines, having a lower content of crystallized triglycerides at body temperature than margarines prepared with an equivalent amount of oil rich in linoleic acid residues but with other hard fat blends.

In the preparation of margarine or other edible, plastic water-in-fat emulsions the fat composition can be emulsified with an aqueous phase in the usual manner at a temperature at which the fat composition is liquid. Subsequently, the emulsion is rapidly cooled in a conventional surface-scraped heat exchanger, e.g. of the Votator type, as described in "Margarine" by Andersen and Williams, Pergamon Press (1965), page 246 et seq. Usually the liquid emulsion is cooled with the aid of a Votator A-unit from a temperature of 35°-45° C. to a temperature of 5°-25° C. and subsequently packaged after the cooled emulsion has passed a resting tube, e.g. a Votator B-unit. If the margarine is filled in liquid form into tubs, the liquid emulsion is conveyed through one or more surface-scraped heat exchangers and brought straight into these tubs.

The aqueous phase may contain the usual margarine additives, for example emulsifiers, salt and flavouring agents. Additives soluble in oil, such as vitamins, can be added to the fatty phase. Usually the amount of fatty phase in margarine is 75-85%, calculated on the weight of the emulsion, depending on the local legal regulations concerning margarine. However, higher percentages of aqueous phase can also be used for the preparation of so-called low-calorie margarines, which may contain 35, 40 or 50-60% of fat.

The great advantage of the present invention is that it provides for the preparation of margarine fats that have little solid phase at body temperature (about 35° C.) and consequently melt readily in the mouth and spread well in the entire temperature range in which they are used. The spreadability can be determined by measuring the hardness. The hardness of margarines can be measured in a simple manner, using the cone penetrometer as described in J.A.O.C.S. 36 (1959), 345-348. In addition to measuring of the hardness, it is also important to measure other properties of the fat blends according to the invention: measuring of NMR values, as described in "Fette, Seifen, Anstrichmittel" 80 (1978), 180-186, gives an indication of the solids content of the fat mixture at the various temperatures.

The invention will now be illustrated by means of the following Example.

EXAMPLE

Hard fats were prepared from the following raw materials:
(1) hydrogenated lower-melting fractions of fats rich in lauric acid residues.
(1.1) palmkernel olein (dry-fractionated) hardened to melting point 41° C., iodine value <3;
(2) hydrogenated fat rich in fatty acid residues having 16–18 carbon atoms;
(2.1) palm oil stearin (wet-fractionated) hardened to melting point 58° C., iodine value <3;
(2.2) palm oil stearin (dry-fractionated) hardened to melting point 58° C., iodine value <3;
(2.3) palm oil hardened to melting point 58° C., iodine value <3.

The melting point, as mentioned in this description, is the slip melting point as described in Boekenoogen "Analysis and Characterization of Oils, Fats and Fat Products", Vol. I, 1964, Interscience Publishers, pp. 167–170.

The preparation of the hard fats was effected by mixing one or more fats of class (1) with one or more fats of class (2) and randomly interesterifying the mixture obtained.

The interesterification took place as follows: The mixture of fats was dried to a water content of less than 0.03% by weight and subsequently interesterified at a temperature within the range of 110°–140° C. with stirring in a vessel kept under a vacuum of about 2 mm mercury, 0.01 to 0.3 or 0.5% by weight of sodium ethoxide being added as a catalyst. After about 20 minutes the vacuum was released. The catalyst was inactivated by washing the interesterified mixture with water, whereafter the mixture was dried again.

The fractionation was carried out as follows:
(a) (Wet) Fractionation using acetone
The fat to be fractionated was dissolved in acetone (weight ratio fat/acetone 1:5). The solution was poured into a funnel provided with a cooling jacket and stirring means and slowly cooled to the fractionation temperature. The mixture was kept at this temperature for two hours and subsequently filtered through a Büchner filter. The residue was washed twice with acetone, after which the acetone was distilled from both fractions. For fractionation at high temperatures it was necessary to add crystal nuclei.
(b) Dry fractionation
The fat was heated to 80° C., poured into a vessel with cooling jacket and stirring means and subsequently slowly cooled to the fractionation temperature. Then a small amount of fat was added in order to get the crystallization started, which was continued for four hours, whereafter the mixture was filtered through a Büchner filter.

The fat compositions were prepared by mixing a hard fat composition with a liquid oil which contained at least 40% polyunsaturated fatty acid residues. The results are summarized in the Table below.

In this Table A–C stands for margarine fats prepared from 12.9% by weight of hard fat and 87.1% by weight of sunflower oil. The hard fats used were obtained by interesterification of the following raw materials:

TABLE II

| A | 44 parts by weight (2.1) and 56 parts by weight (1.1) |
| B | 44 parts by weight (2.3) and 56 parts by weight (1.1) |
| C | 44 parts by weight (2.2) and 56 parts by weight (1.1) |

| | | Sample | | |
|---|---|---|---|---|
| | | A | B | C |
| hardness (g/cm²) | 5° C. | 145 | 110 | 105 |
| | 10° C. | 115 | 100 | 105 |
| | 15° C. | 105 | 90 | 95 |
| | 20° C. | 95 | 85 | 90 |
| hardness (g/cm²) after 3 weeks | 5° C. | 175 | 155 | 180 |
| | 20° C. | 85 | 145 | 100 |
| hardness (g/cm²) after 6 weeks | 5° C. | 175 | 205 | 250 |
| | 20° C. | 85 | 145 | 100 |

The hardness of the margarine samples was measured by the method developed by Haighton, as described in J.A.O.C.S. 36 (1959), pp. 345–348.

The margarines were prepared as follows:

The margarine fat blend was melted with 0.1% by weight of monoglycerides of fully hardened palm oil and emulsified with acidified milk as aqueous phase, an emulsion being obtained that contained 80% fat.

The emulsion was crystallized and cooled to 15° C. in a closed surface-scraped heat exchanger (Votator A-unit). The cooling temperatures in the A-unit were from −6° C. to 10° C., and 40% of the treated emulsion was circulated. Subsequently, the crystallized emulsion was allowed to pass a resting tube, in which the emulsion crystallized further for 160 seconds, whereafter the product still in a liquid state was packaged in tubs.

The samples A, B and C showed the following NMR values:

| | N10 | N15 | N20 | N25 | N30 | N35 |
|---|---|---|---|---|---|---|
| A | 10.8 | 8.5 | 6.5 | 4.5 | 2.7 | 0.7 |
| B | 11.7 | 8.7 | 7.4 | 5.3 | 3.3 | 1.7 |
| C | 11.4 | 8.6 | 6.9 | 5.4 | 3.1 | 1.9 |

We claim:
1. Fat blend suitable to be worked into margarines, low-calorie spreads or cooking fats comprising:
 (a) 30–98 parts by weight of an oil liquid at room temperature; and
 (b) 2–35 parts by weight of a randomly interesterified hydrogenated blend of triglycerides prepared from a mixture of:
  ($b_1$) 20–80 parts by weight of an olein fraction of a fat rich in lauric acid residues; and
  ($b_2$) 80–20 parts by weight of a fat rich in fatty acid residues having 16–18 carbon atoms;
 the percentage of saturated fat residues being 75% or more of the fatty acid residues of the interesterified fat.

2. Fat blend according to claim 1, in which the randomly interesterified hydrogenated blend is prepared from a mixture of an olein fraction of a fat rich in lauric acid residues and a fraction of a fat rich in saturated fatty acid residues having 16–18 carbon atoms.

3. Fat blend according to claim 2, in which the fraction of the fat rich in saturated fatty acid residues having 16–18 carbon atoms is a stearin fraction.

4. Fat blend according to claim 1, in which the weight ratio between the fat containing lauric acid residues and the fat rich in fatty acid residues having 16–18 carbon atoms is 35–65:65–35.

5. Fat blend according to claim 1, which comprises 6–30 parts by weight of the interesterified hydrogenated blend and 94–70 parts by weight of an oil rich in linoleic acid residues.

6. Fat blend according to claim 5, containing not more than 20% of the interesterified hydrogenated blend.

7. A fat blend according to claim 1 further comprising up to 35% of hydrogenated fat having a slip melting point of 25°–45° C.

8. Fat blend according to claim 1 in which the weight ratio between the fat containing the lauric acid residues and the fat rich in fatty acid residues having 16–18 carbon atoms is 40–58:60–42.

9. Fat blend according to claim 1 comprising 96–30 parts by weight of the oil liquid at room temperature:
 (1) 2–35 parts by weight of the interesterified hydrogenated blend; and
 (2) 2–35 parts by weight of hydrogenated fat having a slip melting point of 25°–45° C.

10. Margarines and low calorie margarines obtained by emulsifying a fat blend according to any of claims 6, 1, and 9 with a suitable aqueous phase.

11. Process for preparing a fat blend suitable for being worked into margarines, low-calorie spreads or cooking fats comprising the steps of:
 (1) preparing an interesterified hydrogenated blend of triglycerides from 20–80 parts by weight of an olein fraction of a fat rich in lauric acid residues and 80–20 parts by weight of a fat rich in fatty acid residues with 16–18 carbon atoms such that the percentage of saturated fatty acid residues is 75% or more of the fatty acid residues of the interesterified hydrogenated blend; and
 (2) mixing 2–35 parts by weight of the interesterified hydrogenated blend with 0–35 parts by weight of hydrogenated fat having a slip melting point of 25°–45° C., and with 98–30 parts by weight of oil liquid at room temperature.

12. Process according to claim 11, wherein before the interesterification either the olein fraction of a fat rich in lauric acid residues or the triglycerides derived from a fat rich in fatty acid residues with 16–18 carbon atoms or both are hydrogenated to an iodine value below 5.

13. Process according to claim 12, wherein the iodine value is below 3.

14. Process according to claim 11, wherein the interesterified hydrogenated blend is 2–35% by weight, the hydrogenated fat is 2–35% by weight and the balance is oil liquid at room temperature.

15. Process according to claim 11, wherein the interesterified hydrogenated blend is 6–30% by weight and an oil liquid at room temperature which is rich in linoleic acid residues is 94–70% by weight.

16. Process according to claim 15, wherein the interesterified hydrogenated blend is 6–20% by weight and an amount of oil rich in linoleic acid residues is 94–80% by weight.

17. Process according to claim 11, wherein the interesterified hydrogenated blend is prepared by interesterifying a mixture of 35–65 parts by weight of the olein fraction of a fat rich in lauric acid residues and 65–35 parts by weight of the triglyceride derived from the fat rich in fatty acid residues with 16–18 carbon atoms.

18. Process according to claim 17, wherein 40–58 parts by weight of the olein fraction of a fat rich in lauric acid residues is interesterified with 60–42 parts by weight of the triglycerides derived from the fat rich in fatty acid residues with 16–18 carbon atoms.

19. Process according to claim 11, wherein the triglycerides derived from the fat rich in fatty acid residues with 16–18 carbon atoms are a stearin fraction of that fat.

20. Process for preparing a water-in-oil emulsion margarine or a low-calorie spread, comprising emulsifying a fatty phase with an aqueous phase wherein the fatty phase is obtained from a fat blend prepared by a process according to any of claims 14, 15, 11 and 16.

21. Process according to claim 17 or 18, wherein the olein fraction of a fat rich in lauric acid residues is hydrogenated to an iodine value of below 10.

22. Process according to claim 21, wherein the iodine value is below 5.

* * * * *